United States Patent
Imai et al.

(10) Patent No.: US 7,218,069 B2
(45) Date of Patent: May 15, 2007

(54) DOOR OPENING/CLOSING DEVICE

(75) Inventors: Takuya Imai, Yamanashi (JP);
Tsunenori Senbongi, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 11/313,802

(22) Filed: Dec. 22, 2005

(65) Prior Publication Data

US 2006/0137251 A1    Jun. 29, 2006

(30) Foreign Application Priority Data

Dec. 28, 2004   (JP)   .............................. 2004-379883

(51) Int. Cl.
    *H02P 1/00*   (2006.01)
(52) U.S. Cl. ...................... 318/257; 318/469; 318/280; 318/466
(58) Field of Classification Search ................ 318/257, 318/469, 280, 432, 282, 433, 434, 445, 465, 318/466, 468
See application file for complete search history.

(56) References Cited

U.S. PATENT DOCUMENTS

2004/0189046 A1* 9/2004 Kawanobe et al. ......... 296/155
2005/0151495 A1* 7/2005 Miyauchi .................... 318/469

FOREIGN PATENT DOCUMENTS

JP       09-125823 A    5/1997
JP       2003-143882 A  5/2003

* cited by examiner

*Primary Examiner*—Karen Masih
(74) *Attorney, Agent, or Firm*—Foley & Lardner LLP

(57) ABSTRACT

A first judging unit integrates an increase in a corrected current when the corrected current is in a predetermined increasing state and judges that a first condition is satisfied when an integrated increase exceeds a threshold. A second judging unit integrates a decrease in door moving speed when the door moving speed is in a predetermined decreasing state and judges that a second condition is satisfied when an integrated decrease exceeds a threshold. A third judging unit integrates a decrease in motor rotation speed when the motor rotation speed is in a predetermined decreasing state and judges that a third condition is satisfied when an integrated decrease exceeds a threshold. A pinch judging unit judges whether pinch has occurred based on determination by the first, the second, and the third judging units.

11 Claims, 13 Drawing Sheets

DOOR OPENING/CLOSING DEVICE

BACKGROUND OF THE INVENTION

1. Field of the Invention

The present invention relates to a door opening/closing device that detects abnormality in which a foreign matter is caught in a door.

2. Description of the Related Art

Conventionally, a device for opening and closing a sliding door of a vehicle includes a pinch detecting device. The pinch detecting device detects an abnormality in which a foreign matter is caught in a door. The pinch detecting device includes a door driving unit that has a motor, a load detecting unit that detects a load on the motor, a position detecting unit that detects a position of the door, a storing unit that stores data on the load in association with a sampling area addressed according to the position of the door, a updating unit that updates the data every time the data is read out for an address of a latest sampling area, and an estimating unit that reads out data on the load of a sampling area that is an appropriate number of areas ahead of a sampling area where the door is actually present, and that estimates a load on the motor for moving the door, based on read data and data on a load of the sampling area where the door is actually present. The abnormality is detected based on a deviation between estimated load and the load of the sampling area where the door is actually present (for example, Japanese Patent Application Laid-Open No. H9-125823).

Conventionally, such abnormality, in which a foreign matter is caught in a door, is detected based on a deviation in a load on a motor, which is a deviation in a current. To improve detection accuracy, a threshold for detecting the abnormality should be lowered. However, when the threshold is lowered, the pinch detecting device can erroneously detect a load caused due to other reasons, such as a resistance to movement of a door, as such abnormality.

SUMMARY OF THE INVENTION

It is an object of the present invention to at least solve the problems in the conventional technology.

A door opening/closing device according to one aspect of the present invention moves a door by a motor, and includes an ideal-current calculating unit configured to calculate an ideal current for moving the door at a target speed; a actual-current calculating unit configured to calculate an actual current to be actually supplied to the motor based on the ideal current and present speed of the door, wherein the actual-current calculating unit calculates the actual current at a predetermined cycle; a current adding unit configured to determine whether an actual current calculated in a present cycle is larger than an actual current calculated in a previous cycle, and to add, when the actual current calculated in the present cycle is determined to be larger than the actual current calculated in the previous cycle, a current difference between the actual current calculated in the present cycle and the actual current calculated in a previous cycle to a total current difference obtained by adding current differences that have been calculated; a first determining unit configured to determine that a first condition is satisfied when the total current difference exceeds a threshold; a door-speed detecting unit configured to detect a speed of the door, wherein the door-speed detecting unit detects the speed of the door at a predetermined cycle; a door-speed adding unit configured to determine whether a speed of the door detected in a present cycle is lower than a speed of the door detected in a previous cycle, and to add, when the speed of the door detected in the present cycle is determined to be lower than the speed of the door detected in the previous cycle, a speed difference between the speed of the door detected in the present cycle and the speed of the door detected in the previous cycle to a total speed difference obtained by adding speed differences that have been calculated; a second determining unit configured to determine that a second condition is satisfied when the total speed difference exceeds a threshold; a rotation detecting unit configured to detect a rotation speed of the motor, wherein the rotation detecting unit detects the rotation speed at a predetermined cycle; a rotation-speed adding unit configured to determine whether a rotation speed detected in a present cycle is lower than a rotation speed detected in a previous cycle, and to add, when the rotation speed detected in the present cycle is determined to be lower than the rotation speed detected in the previous cycle, a rotation difference between the rotation speed detected in the present cycle and the rotation speed detected in the previous cycle to a total rotation difference obtained by adding rotation differences that have been calculated; a third determining unit configured to determine that a third condition is satisfied when the total rotation difference exceeds a threshold; a pinch determining unit configured to determine whether a foreign matter is caught in the door based on determination by the first determining unit, the second determining unit, and the third determining unit.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention are explained in detail below with reference to the accompanying drawings.

Exemplary embodiments of the present invention are explained in detail below with reference to the accompanying drawings. Note that the present invention is not limited to the embodiments below.

Figure 1:
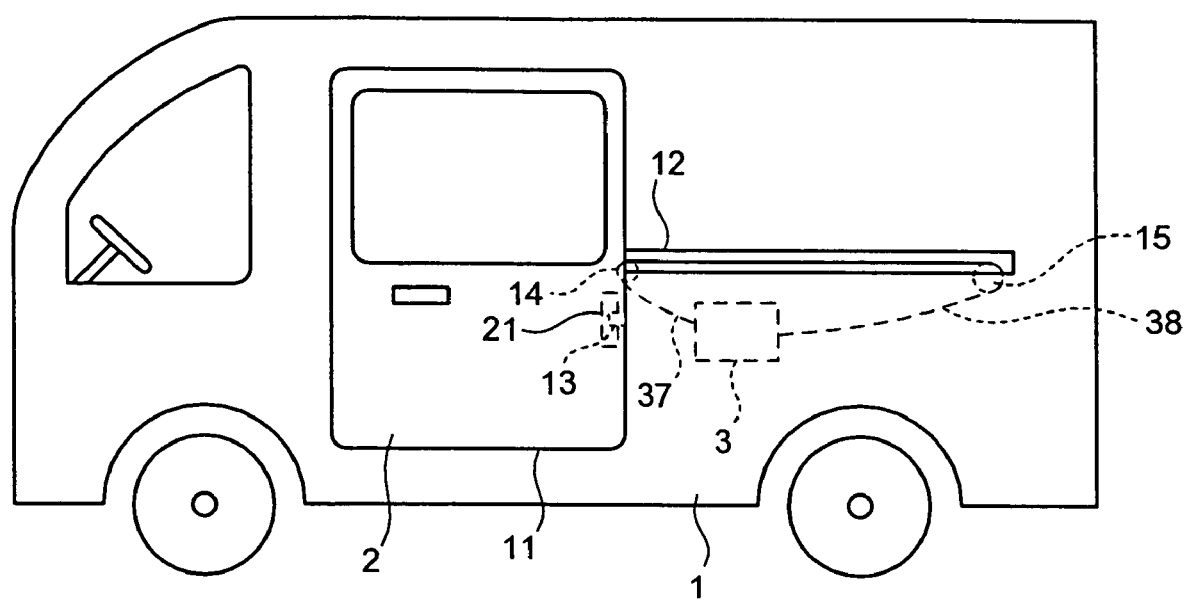
FIG. 1 is a side view of a vehicle provided with a door opening/closing device according to an embodiment of the present invention.
Figure 2:
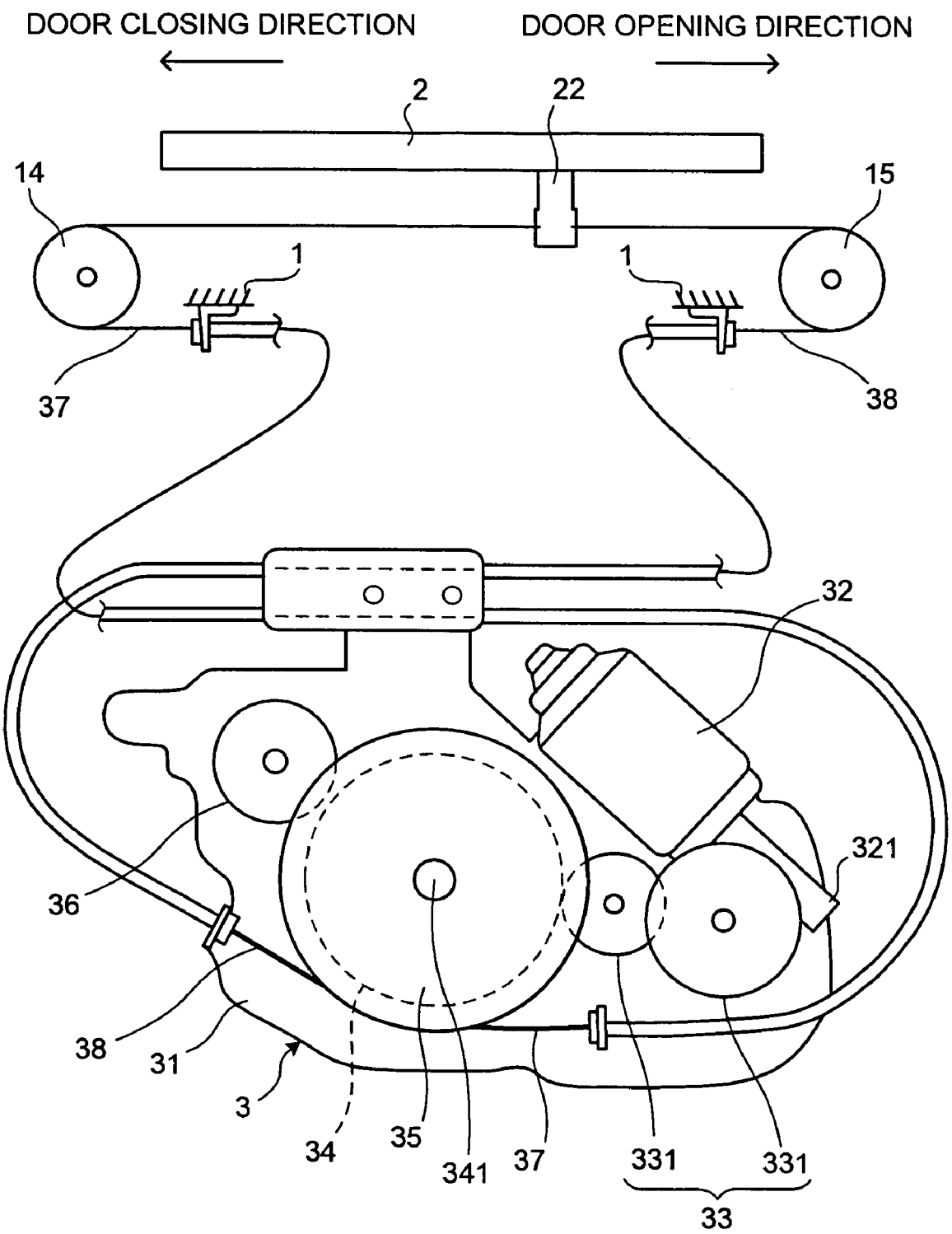
FIG. 2 is a schematic of a driving system of the door opening/closing device.

FIG. 1 is a side view of a vehicle provided with a door opening/closing control device in an embodiment of the present invention. FIG. 2 is a schematic of a driving system of the door opening/closing control device.

A door opening/closing apparatus 3 according to the embodiment moves a sliding door (hereinafter, "door") 2 that opens and closes an opening 11 formed on a side of a vehicle body 1. The door 2 is provided such that the door is slidable along a guide rail 12 in a front to rear direction of the vehicle body 1. The guide rail 12 holds an upper end and a lower end of the door 2.

The door 2 includes a latch mechanism 21 that is engages with a striker 13 provided in the opening 11. The latch mechanism 21 is engaged with the striker 13 when the door 2 reaches a position that brings the door 2 in a fully-closed state so that the door 2 is held in the fully-closed state. The latch mechanism 21 is a conventional latch mechanism and takes a half-latch state, in which the latch mechanism 21 temporarily holds the door 2 before the door 2 is fully-closed, and a full-latch state, in which the latch mechanism 21 holds the door 2 at a position at which the door 2 is fully-closed. Furthermore, the latch mechanism 21 includes a closer mechanism and a release mechanism. The closer mechanism brings the striker 13 into the full-latch state when the half-latch state is detected. The release mechanism includes a solenoid for bringing the striker 13 into an unlatch state for releasing the door 2 from the full-latch state according to a door opening instruction. The closer mechanism and the release mechanism are also known technology. Moreover, a latch mechanism for holding the door 2 in a fully-open state is provided between the vehicle body 1 and the door 2. The latch mechanism includes a release mechanism.

The door opening/closing control device 3 is fixed to the vehicle body 1 via a base plate 31. As shown in FIG. 2, the base plate 31 includes a driving motor 32, a deceleration mechanism 33, a clutch 34, a wire drum 35, and an electromagnetic brake 36.

The driving motor 32 is fixed to the base plate 31 sideways. A worm gear 321 is provided in an output shaft (not shown) of the driving motor 32.

The deceleration mechanism 33 includes a plurality of deceleration gears 331 that mesh with each other. The deceleration gear 331 on an input side of the deceleration mechanism 33 is meshed with the worm gear 321 of the driving motor 32.

The clutch 34 includes a clutch shaft 341. A gear (not shown) provided in the clutch shaft 341 is meshed with the deceleration gear 331 on an output side of the deceleration mechanism 33. Rotation of the driving motor 32 is transmitted to the clutch shaft 341 of the clutch 34 via the deceleration mechanism 33. The clutch 34 in this embodiment is constituted as an electromagnetic clutch. The clutch 34 freely switches the rotation of the driving motor 32, which is transmitted to the clutch shaft 341, electrically to couple and uncouple the clutch 34 to and from a driving system in a later stage of the clutch shaft 341.

The wire drum 35 is rotatably arranged around the clutch shaft 341. The wire drum 35 is constituted as the driving system in a later stage of the clutch shaft 341. The deceleration mechanism 33 and the wire drum 35 are freely switched into the coupled state and the uncoupled state electrically by the clutch 34. One end sides of two wire cables 37 and 38 are wound around the wire drum 35, respectively. The other end side of one wire cable 37 is coupled to a bracket 22, which extends from the door 2 through a front side pulley 14 pivotally supported to be rotatable on the vehicle body 1 side. The other end side of the other wire cable 38 is coupled to the bracket 22 through a rear side pulley 15 pivotally supported to be rotatable on a side of the vehicle body 1.

The electromagnetic brake 36 is actuated by electrical control to apply braking to the wire drum 35.

In the door opening/closing control device 3 described above, by driving the driving motor 32, the wire drum 35 rotates around the clutch shaft 341 via the deceleration mechanism 33 and the clutch 34 that is in the coupled state. When the wire drum 35 rotates clockwise in FIG. 2, one wire cable 37 is wound by the wire drum 35 and the other wire cable 38 is pulled out from the wire drum 35. Thus, the door 2 moves in a direction toward to the front side pulley 14 to close the opening 11. Conversely, when the wire drum 35 rotates counterclockwise, one wire cable 37 is pulled out from the wire drum 35 and the other wire cable 38 is wound by the wire drum 35. As a result, the door 2 moves in a direction toward the rear side pulley 15 to open the opening 11.

If a door stop is instructed while an opening operation or a closing operation of the door 2, the door 2 is stopped at a halfway position in which the door 2 closes the opening 11 halfway. In this case, the driving by the driving motor 32 is stopped. Braking is applied to the wire drum 35 by the electromagnetic brake 36 in addition to a braking force of the driving motor 32 to stop the door 2. The door 2 is kept to be stopped at the halfway position by maintaining the clutch 34 in the coupled state or maintaining the braking control of the electromagnetic brake 36. The clutch 34 and the electromagnetic brake 36 do not always have to be provided separately. For example, an electromagnetic brake may be formed integrally with a clutch.

Figure 3:
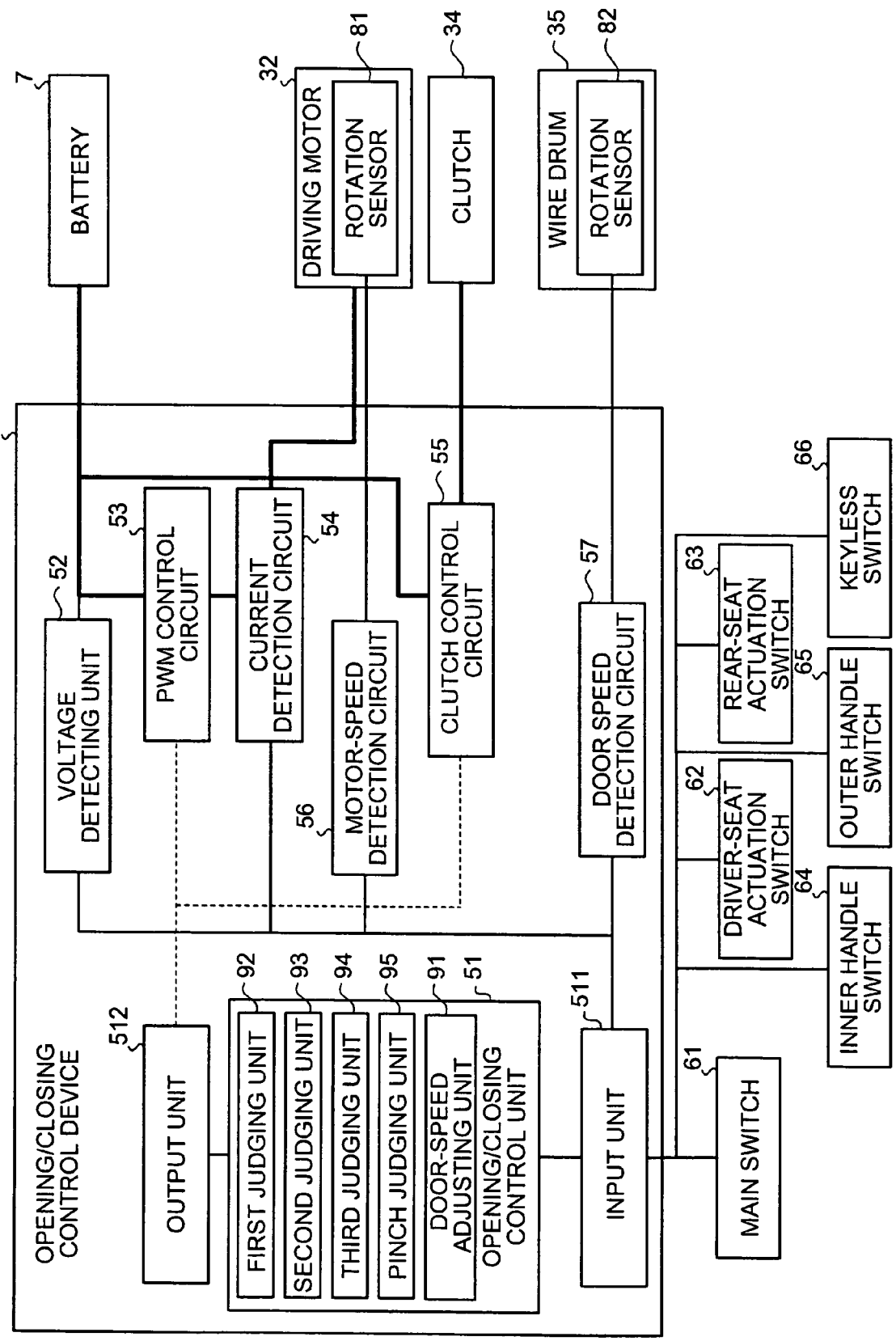
FIG. 3 is a block diagram of a control system of the door opening/closing device.

FIG. 3 is a block diagram of a control system of a door opening/closing control device. An opening/closing control device 5 shown in FIG. 3 includes an opening/closing control unit 51 for collectively controlling the door opening/closing control device 3 according to data and a program stored therein in advance. A voltage detecting unit 52, a pulse width modulation (PWM) control circuit 53, a current detection circuit 54, and a clutch control circuit 55 are connected to the opening/closing control unit 51 as a power supply system. The voltage detecting unit 52 and the current detection circuit 54 are connected to the opening/closing control unit 51 via an input unit 511. The PWM control circuit 53 and the clutch control circuit 55 are connected to the opening/closing control unit 51 via an output unit 512. A motor-speed detection circuit 56 and a door-speed detection circuit 57 are also connected to the opening/closing control unit 51 as a detection system via the input unit 511. Moreover, a main switch 61, a driver-seat actuation switch 62, a rear-seat actuation switch 63, an inner handle switch 64, an outer handle switch 65, and a keyless switch 66 are also connected to the opening/closing control unit 51 as a group of switches via the input unit 511.

The voltage detecting unit 52 is a unit for detecting a voltage at a battery 7 mounted on the vehicle body 1. The voltage detected by the voltage detecting unit 52 is input to the opening/closing control unit 51 via the input unit 511. The voltage at the battery 7 is supplied from the PWM control circuit 53 to the driving motor 32 through the current detection circuit 54. Moreover, the voltage at the battery 7 is supplied to the clutch 34 through the clutch control circuit 55.

The PWM control circuit 53 is a circuit for controlling a voltage supplied to the driving motor 32. Motor rotational speed of the driving motor 32, that is, moving speed of the door 2 is changed by changing application time of a voltage.

The current detection circuit 54 is a circuit for detecting a current value applied to the driving motor 32. Note that adjustment of an output of the driving motor 32 by the PWM control circuit 53 is performed through adjustment of voltage application time (DUTY control) in one cycle (e.g., 2000 Hz). At the time of a maximum output, since a DUTY ratio is 100%, a voltage waveform is that of a DC voltage. Thus, it is possible to directly measure an actual load current value of the driving motor 32 in the current detection circuit 54. On the other hand, since a DUTY ratio in an acceleration area and a deceleration area is less than 100%, a waveform of an applied voltage appears in pulse. Thus, the driving motor 32 is substantially AC driven. In this AC driven area, since a current value fluctuates continuously, it is necessary to level the current value. Thus, the current detection circuit 54 multiplies an AC current value by a predetermined correction coefficient to obtain a corrected current value based on an actual load of the driving motor 32. The current detection circuit 54 obtains a corrected current to be applied to the driving motor 32. The corrected current is obtained by correcting an actual current generated by driving of the driving motor 32 based on a load current that has actually been consumed for movement of the door 2.

The clutch control circuit 55 is a circuit for supplying a voltage from the battery 7 to the clutch 34 and instructing driving of the clutch 34.

The motor-speed detection circuit 56 is a circuit for obtaining a signal from a rotation sensor 81 disposed in the driving motor 32 and mainly detecting rotational speed of the motor. The rotation sensor 81 is provided over a rotation shaft, to which rotation of the output shaft of the driving motor 32 is transmitted without being decelerated, such as a rotation shaft to which the deceleration gear 331 on the input side meshing with the worm gear 321 is fixed. The rotation sensor 81 includes a permanent magnet of a disc shape, which is provided to be rotatable with the rotation shaft, and two hall elements (hall ICs) for detecting rotation of the permanent magnetic disc. The respective Hall elements detect rotation of the permanent magnetic disc and output pulse signals of phases different from each other. The motor-speed detection circuit 56 detects rotational speed and a rotation direction of the driving motor 32 by obtaining different pulse signals.

The door-speed detection circuit 57 is a circuit for obtaining signals from a rotation sensor 82 arranged in the wire drum 35 and mainly detecting moving speed of the door 2. The rotation sensor 82 is provided over a rotation shaft to which rotation of the wire drum 35 is transmitted without being decelerated. The rotation sensor 82 has the same constitution as the rotation sensor 81. The door-speed detection circuit 57 detects a moving speed, a moving direction, and positions at which the door 2 is open or closed by obtaining different pulse signals.

The main switch 61 among the group of switches is a switch for enabling opening and closing control of the door opening/closing control device 4. Only when the main switch 61 is on, it is possible to perform opening and closing control of the door opening/closing control device 4. Therefore, when the main switch 61 is off, the door 2 is opened and closed manually. The other switches (the driver-seat actuation switch 62, the rear-seat actuation switch 63, the inner handle switch 64, the outer handle switch 65, and the keyless switch 66) output instruction signals for moving or stopping the door 2, respectively.

The opening and closing control unit 51 includes a door-speed adjusting unit 91, a first judging unit 92, a second judging unit 93, a third judging unit 94, and a pinch judging unit 95.

The door-speed adjusting unit 91 controls, in moving the door 2 to open and close according to driving of the driving motor 32, to move the door 2 at target speed. The door-speed adjusting unit 91 adjusts the speed of the door 2 by adjusting an applied voltage for driving the driving motor 32 to increase or decrease according to at least one of a motor rotation speed detected by the motor-speed detection circuit 56 and a door moving speed detected by the door speed detection circuit 57.

Figure 4:
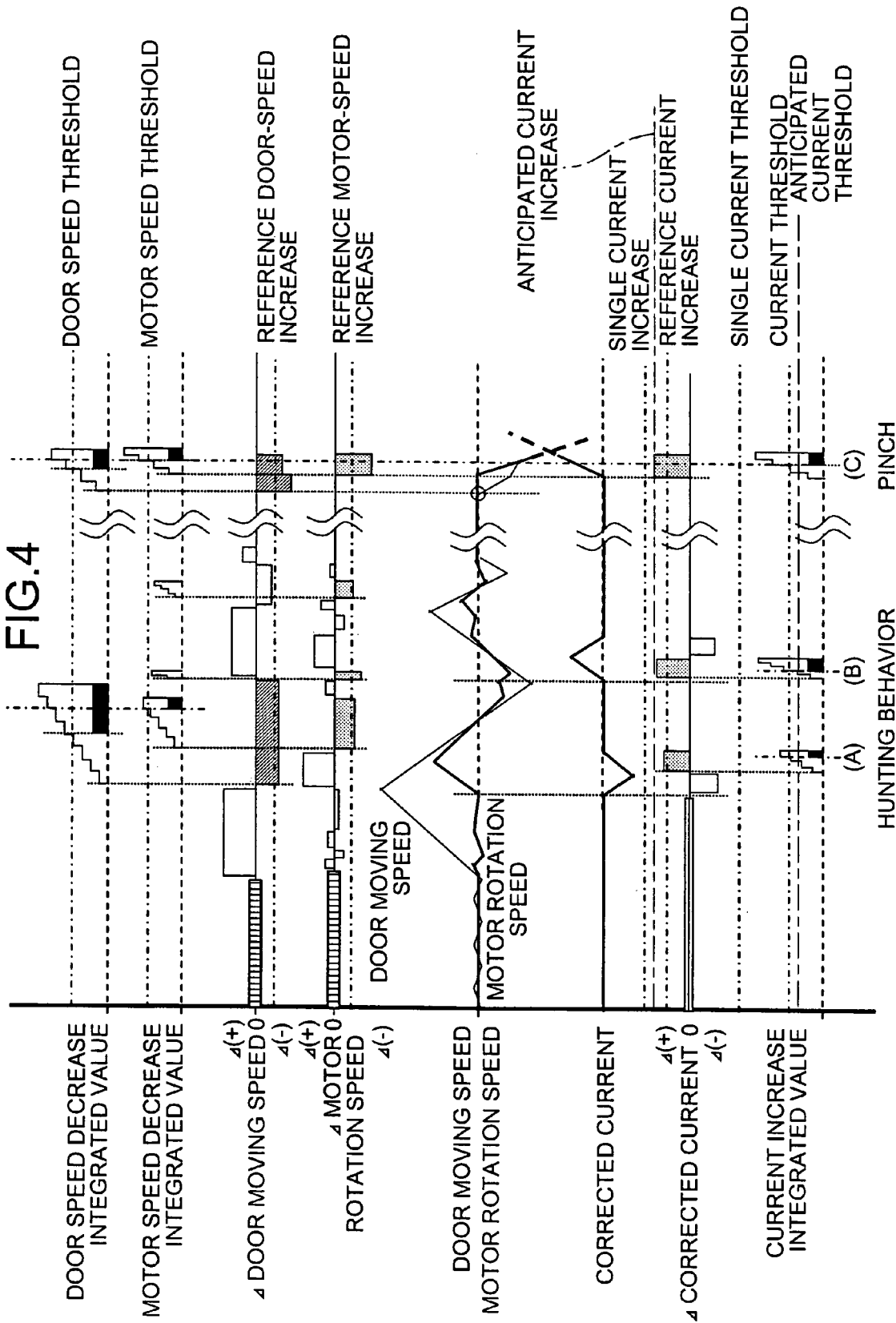
FIG. 4 is a time chart of a processing by the door opening/closing device.
Figure 5:
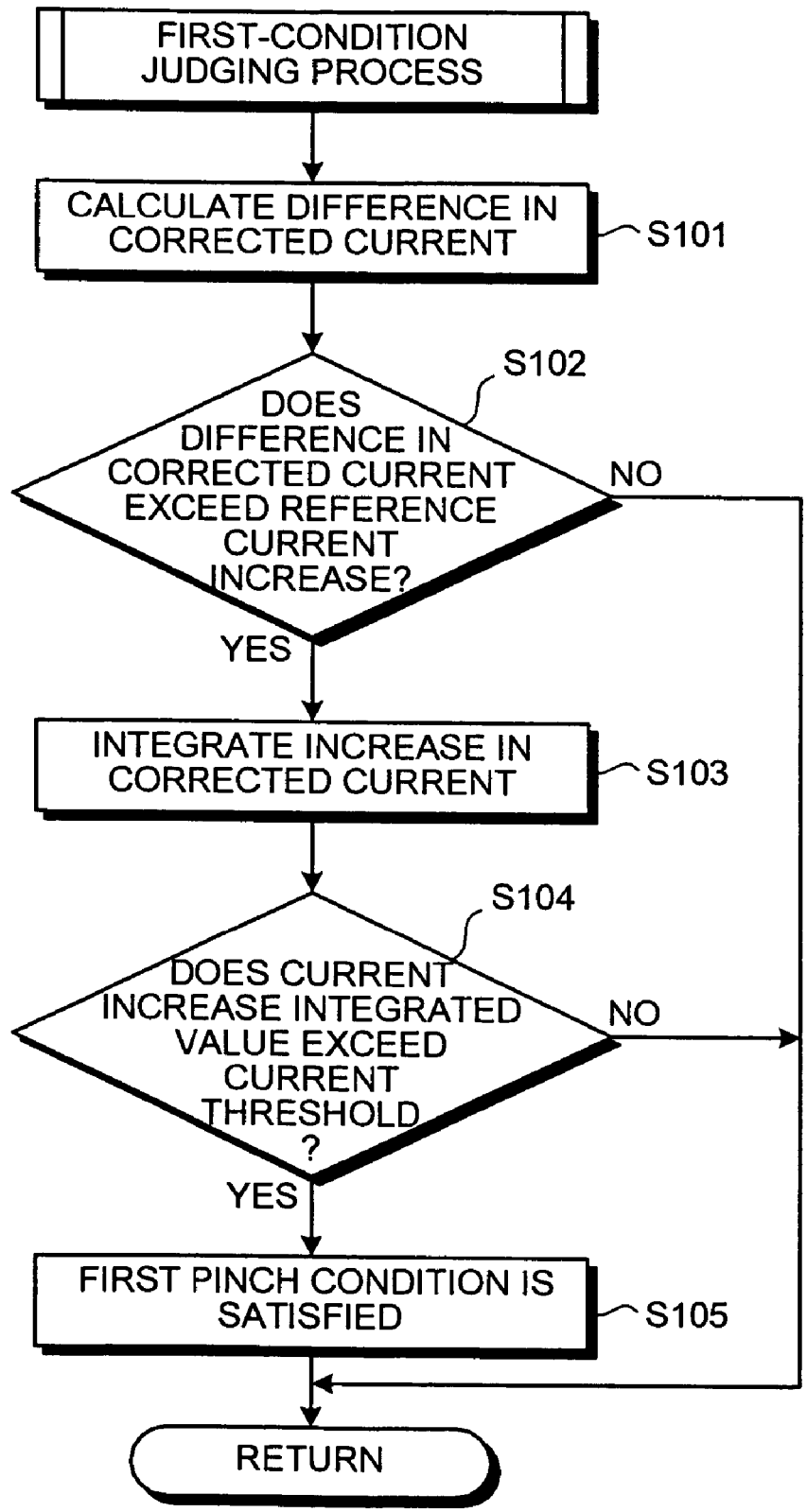
FIG. 5 is a flowchart of a first-condition judging process.

The first judging unit 92 judges whether the first pinch condition is satisfied according to a corrected current obtained by the current detection circuit 54. As described in FIGS. 5 and 4, in first-condition judging process by the first judging unit 92, the first judging unit 92 detects a corrected current of the driving motor 32 in every sampling period and calculates a difference between a corrected current sampled last time and a corrected current sampled this time (step S101). Thus, at step S101, a change in the corrected current is obtained for each arithmetic operation cycle. A predetermined increasing state is a state in which an increase, which is a difference in a corrected current (Δ corrected current), exceeds a predetermined reference current increase where a value zero indicates that there is no increase or decrease. When the increase is in the predetermined increasing state, that is, when an increase in the corrected current is larger than the predetermined reference current increase ("YES" at step S102), the first judging unit 92 integrates the increase in the corrected current to obtain a current increase integrated value (step S103). When the current increase integrated value exceeds a predetermined current threshold, that is, when the current increase integrated value is larger than the predetermined current threshold ("YES" at step S104), the first judging unit 92 judges that the first pinch condition is satisfied (step S105). In FIG. 4, parts colored in black in the current increase integrated value indicate that a flag indicating that the first pinch condition is satisfied is set.

Figure 6:
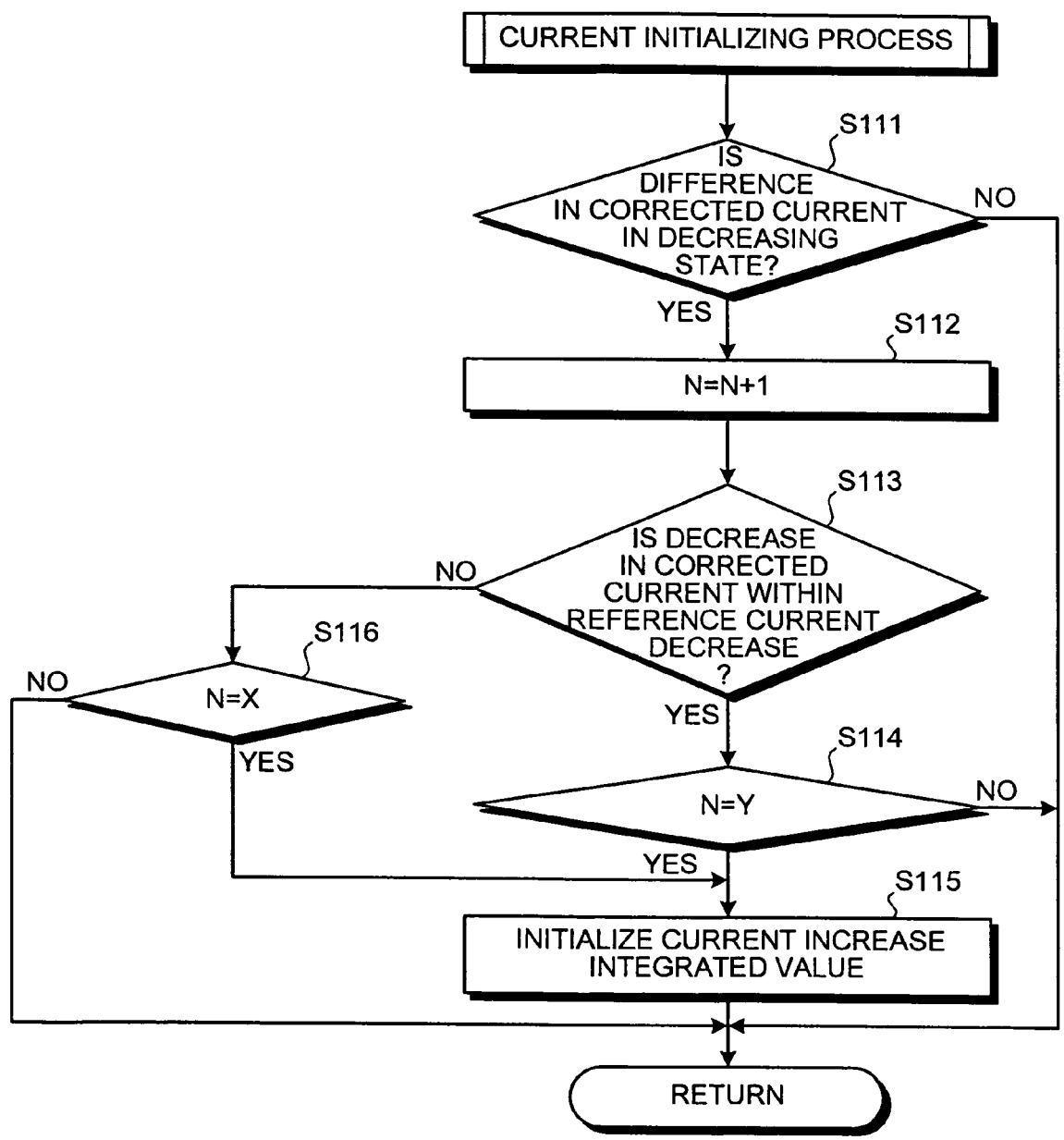
FIG. 6 is a flowchart of a current initializing process.

The first judging unit 92 initializes the current increase integrated value. The current initializing process by the first judging unit 92 is based on the following premise. In the first-condition judging process, a difference in a corrected current (Δ corrected current) is less than the predetermined reference current increase, that is, an increase in a corrected current is smaller than the predetermined reference current increase ("NO" at step S102). As described in FIG. 6, in the current-initializing process, when the difference in a corrected current is in a decreasing state ("YES" at step S111), the first judging unit 92 counts "N=N+1" (step S112). "N" is time in which the current initializing process is performed (a sampling number). "N" is 0 in the first time and then counted up 1, 2, 3, and so on in order. When a decrease in a corrected current is within a predetermined reference current decrease, that is, the decrease in the corrected current does not exceed a reference current decrease ("YES" at step S113) and the current initializing process continues for predetermined time (a sampling number "Y") ("YES" at step S114), the first judging unit 92 initializes the current increase integrated value (step S115). On the other hand, when the decrease in the corrected current exceeds the predetermined reference current decrease ("NO" at step S113) and the predetermined time (the sampling number "X" (X<Y)) has elapsed ("YES" at step S116), the first judging unit 92 initializes the current increase integrated value (step S115). Thus, in the current initializing process, when the decrease in the corrected current is within the predetermined reference current decrease, the first judging unit 92 initializes a current increase integrated value when the current initializing process continues for the predetermined time "Y". Alternatively, the first judging unit 92 initializes a current increase integrated value when the current initializing process continues for the predetermined time "X" shorter than "Y" while the decrease in the corrected current exceeds the predetermined reference current decrease.

Figure 7:
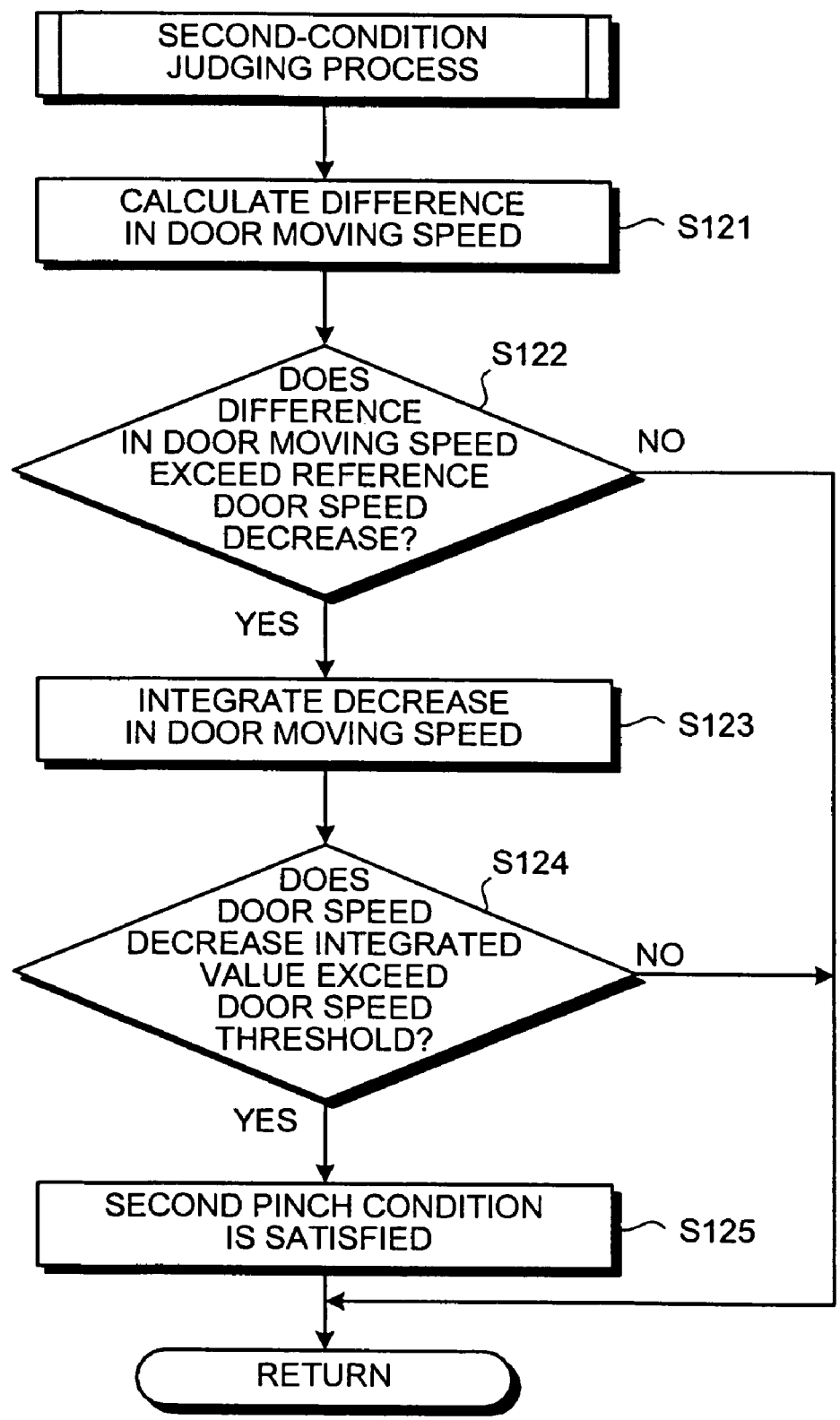
FIG. 7 is a flowchart of second-condition judging process.

The second judging unit 93 judges whether a second pinch condition is satisfied, according to door moving speed detected by the door speed detection circuit 57. As described in FIGS. 7 and 4, in second-condition judging process by the second judging unit 93, the second judging unit 93 captures moving speed of the door 2 in every predetermined sampling period and calculates a difference between door moving speed sampled last time and door moving speed sampled this time (step S121). In this way, at step S121, the second judging unit 93 detects an increase or a decrease in door moving speed and obtains a change in the door moving speed by comparing the door moving speed with a value in the past for each arithmetic operation cycle. In a predetermined decreasing state, a decrease, which is a difference in door moving speed (Δ door moving speed) and is set to 0 when there is no increase or decrease, is in a predetermined decreasing state in which the decrease exceeds a predetermined reference door speed decrease. When the decrease is in the predetermined decreasing state, that is, when a decrease in the door moving speed is larger than the predetermined reference door speed decrease ("YES" at step S122), the second judging unit 93 integrates the decrease in the door moving speed to obtain a door speed decrease integrated value (step S123). When the door speed decrease integrated value exceeds a predetermined door speed threshold, that is, when the door speed decrease integrated value is larger than the predetermined door speed threshold ("YES" at step S124), the second judging unit 93 judges that the second pinch condition is satisfied (step S125). Note that, in FIG. 4, parts colored in black of the door speed decrease integrated value mean that a flag indicating that the second pinch condition is satisfied is set.

Figure 8:
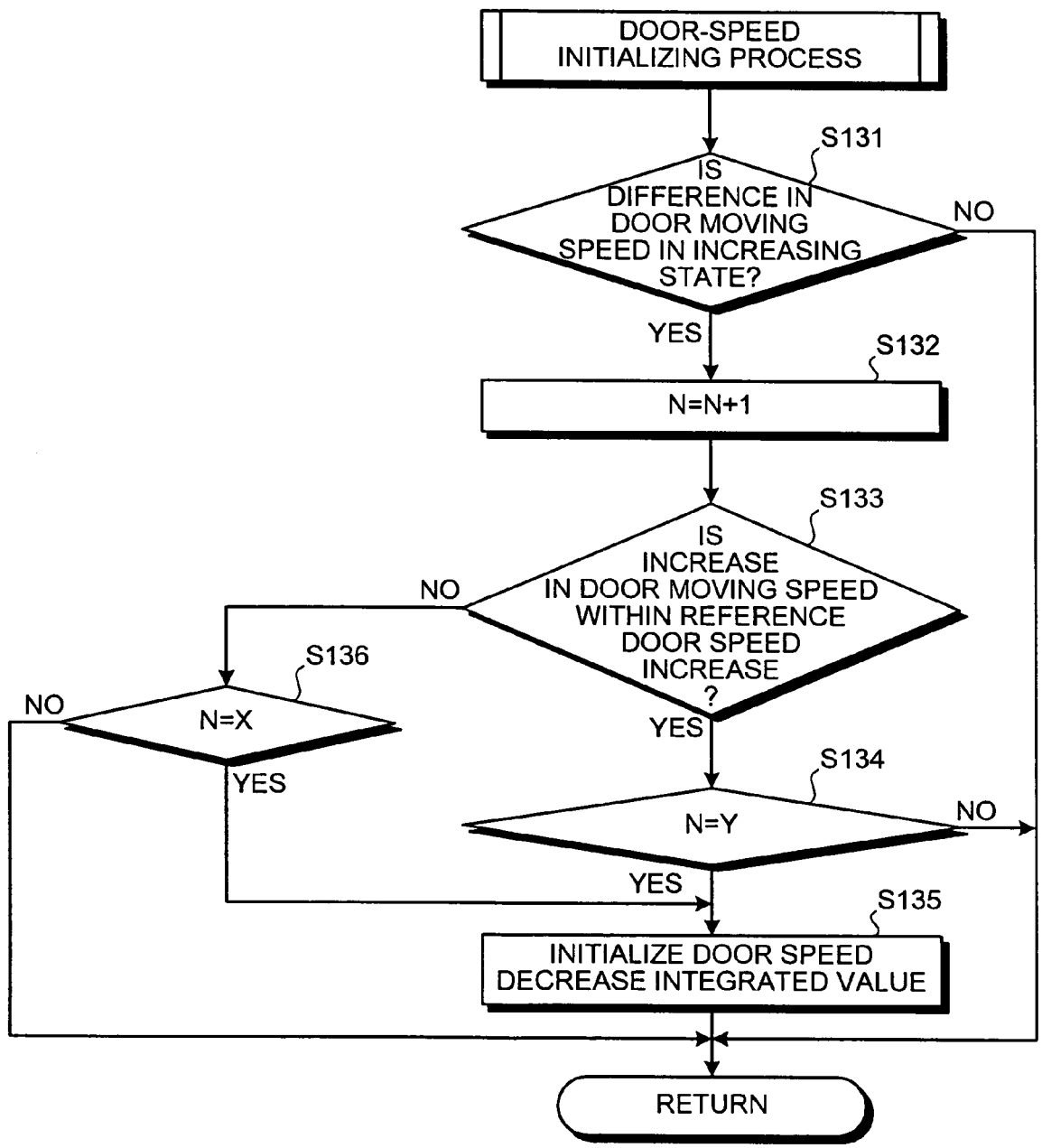
FIG. 8 is a flowchart of a door-speed initializing process.

The second judging unit 93 initializes the door speed decrease integrated value. The door-speed initializing process by the second judging unit 93 is based on the following premise. In the second-condition judging process, a difference in door moving speed (Δ door moving speed) is less than the predetermined reference door speed decrease, that is, a decrease in door moving speed is smaller than the predetermined reference door speed decrease ("NO" at step S122). As described in FIG. 8, in the door-speed initializing process, when the difference in door moving speed is in an increasing state ("YES" at step S131), the second judging unit 93 counts "N=N+1" (step S132). "N" is time in which the door-speed initializing process is performed (a sampling number). "N" is 0 in the first time and then counted up 1, 2, 3, and so on in order. When an increase in door moving speed is within a predetermined reference door-speed increase, that is, the increase in door moving speed does not exceed a reference door-speed increase ("YES" at step S133) and the door-speed initializing process continues for predetermined time (a sampling number "Y") ("YES" at step S134), the second judging unit 93 initializes the door speed decrease integrated value (step S135). On the other hand, when the increase in door moving speed exceeds the predetermined reference door-speed increase ("NO" at step S133) and the predetermined time (the sampling number "X" (X<Y)) has elapsed ("YES" at step S136), the second judging unit 93 initializes the door speed decrease integrated value (step S135). In this way, in the door-speed initializing process, when the increase in door moving speed is within the predetermined reference door-speed increase, the second judging unit 93 initializes a door speed decrease integrated value when the door-speed initializing process continues for the predetermined time "Y". Alternatively, when the increase in door moving speed exceeds the predetermined reference door-speed increase, the second judging unit 93 initializes a door speed decrease integrated value when the door-speed initializing process continues for the predetermined time "X" shorter than "Y". Note that the continuation times "Y and X" for initializing a door speed decrease integrated value may be times (sampling numbers) that are the same as or different from the continuation times "Y and X" for initializing a current increase integrated value in the first judging unit 92.

Figure 9:
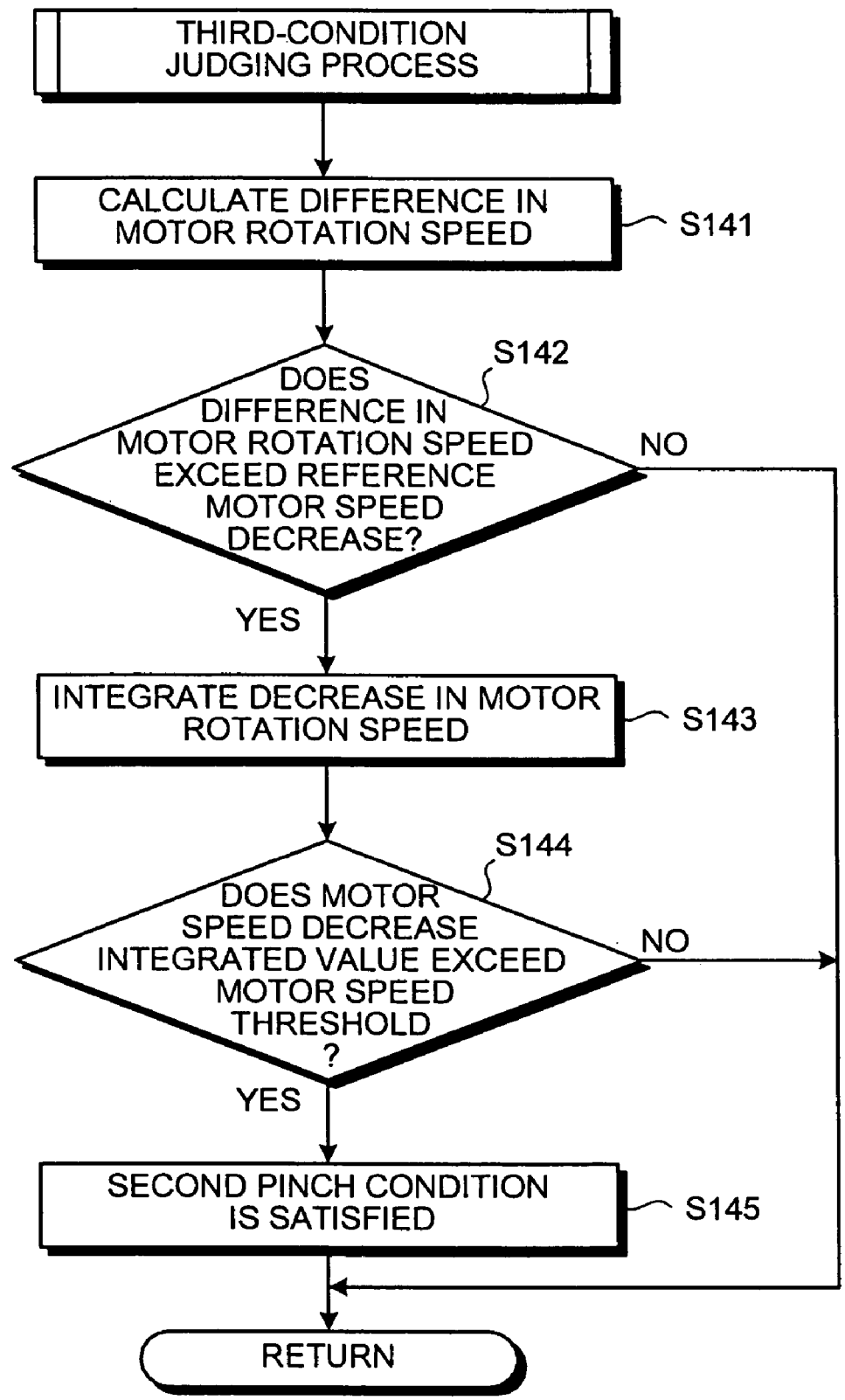
FIG. 9 is a flowchart of a third-condition judging process.

The third judging unit 94 is a unit for obtaining a third pinch condition according to motor rotation speed detected by the motor-speed detection circuit 56. As described in FIGS. 9 and 4, in third-condition judging process by the third judging unit 94, the third judging unit 94 captures rotation speed of the driving motor 32 in every predetermined sampling period and calculates a difference between motor rotation speed sampled last time and motor rotation speed sampled this time (step S141). In this way, at step S141, the third judging unit 94 detects an increase or a decrease in motor rotation speed and obtains a change in the motor rotation speed by comparing the motor rotation speed with a value in the past for each predetermined arithmetic operation cycle. In a predetermined decreasing state, a decrease, which is a difference in motor rotation speed (Δ motor rotation speed) and is set to 0 when there is no increase or decrease, is in a predetermined decreasing state in which the decrease exceeds a predetermined reference motor speed decrease. When the decrease is in the predetermined decreasing state, that is, when a decrease in the motor rotation speed is larger than the predetermined reference motor speed decrease ("YES" at step S142), the third judging unit 94 integrates the decrease in the motor rotation speed to obtain a door speed decrease integrated value (step S143). When the motor speed decrease integrated value exceeds a predetermined motor speed threshold, that is, when the motor speed decrease integrated value is larger than the predetermined motor speed threshold ("YES" at step S144), the third judging unit 94 judges that the third pinch condition is satisfied (step S145). Note that, in FIG. 4, parts colored in black of the motor speed decrease integrated value mean that a flag indicating that the third pinch condition is satisfied is set.

Figure 10:
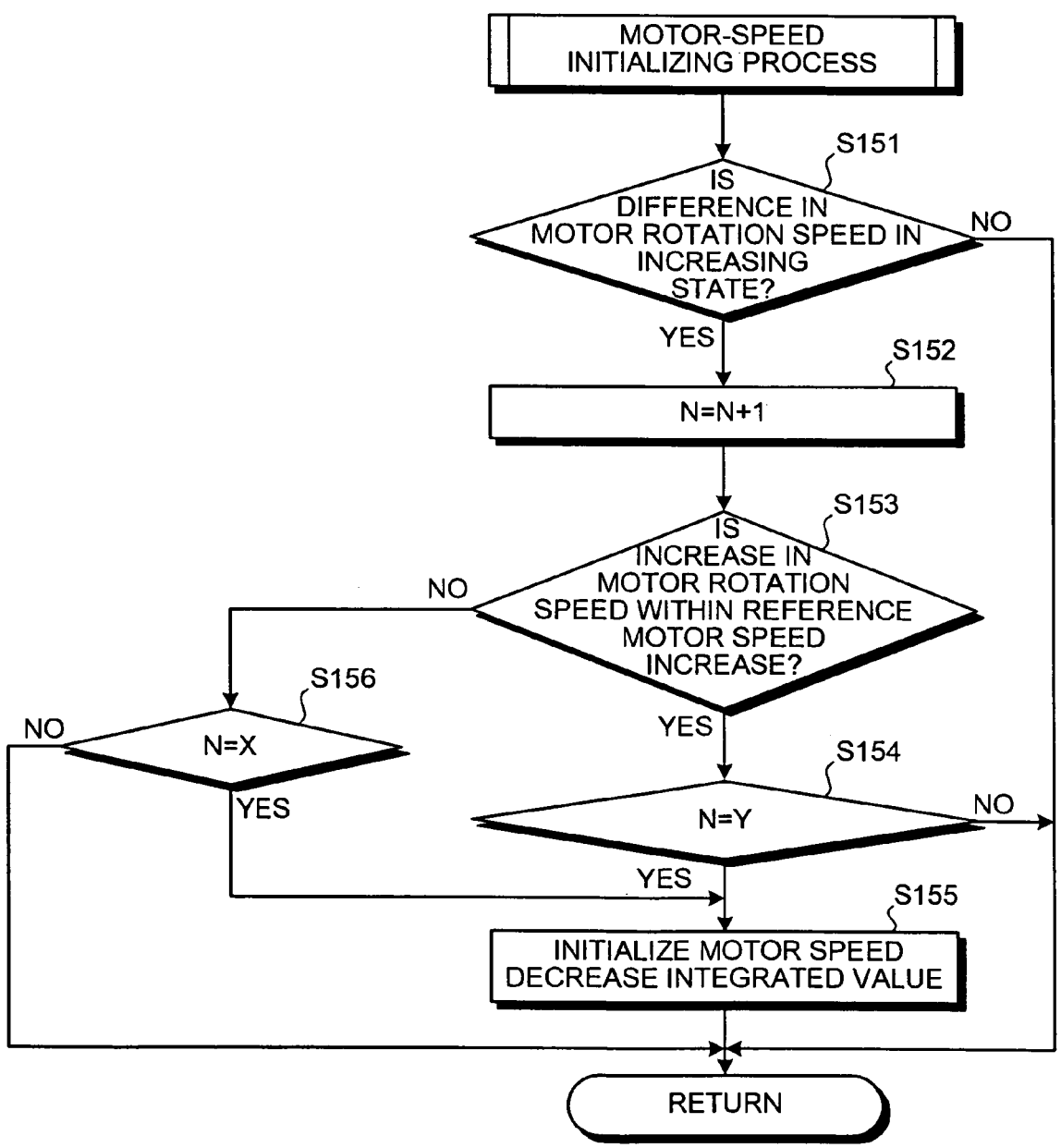
FIG. 10 is a flowchart of a motor-speed initializing process.

The third judging unit 94 initializes the motor speed decrease integrated value. The motor-speed initializing process by the third judging unit 94 is based on the following premise. In the third-condition judging process, a difference in motor rotation speed (Δ motor rotation speed) is less than the predetermined reference motor speed decrease, that is, a decrease in motor rotation speed is smaller than the predetermined reference motor speed decrease ("NO" at step S142). As described in FIG. 10, in the motor-speed initializing process, when the difference in motor rotation speed is in an increasing state ("YES" at step S151), the third judging unit 94 counts "N=N+1" (step S152). "N" is time in which the motor-speed initializing process is performed (a sampling number). "N" is 0 in the first time and then counted up 1, 2, 3, and so on in order. When an increase in motor rotation speed is within a predetermined reference motor-speed increase, that is, the increase in motor rotation speed does not exceed a reference motor-speed increase ("YES" at step S153) and the motor-speed initializing process continues for predetermined time (a sampling number "Y") ("YES" at step S154), the third judging unit 94 initializes the motor speed decrease integrated value (step S155). On the other hand, when the increase in motor rotation speed exceeds the predetermined reference motor-speed increase ("NO" at step S153) and the predetermined time (the sampling number "X" (X<Y)) has elapsed ("YES" at step S156), the third judging unit 94 initializes the motor speed decrease integrated value (step S155). In this way, in the processing for initializing motor speed decrease integrated value, when the increase in motor rotation speed is within the predetermined reference motor-speed increase, the third judging unit 94 initializes a motor speed decrease integrated value when the processing for initializing motor speed decrease integrated value continues for the predetermined time "Y". Alternatively, when the increase in motor rotation speed exceeds the predetermined reference motor-speed increase, the third judging unit 94 initializes a motor speed decrease integrated value when the processing for initializing motor speed decrease integrated value continues for the predetermined time "X" shorter than "Y". Note that the continuation times "Y and X" for initializing a motor speed decrease integrated value may be times (sampling numbers) that are the same as or different from the continuation times "Y and X" for initializing a current increase integrated value in the first judging unit 92 or the continuation times "Y and X" for initializing a door speed decrease integrated value in the second judging unit 93.

The pinch judging unit 95 judges whether pinch (a state in which a part of a human body or a foreign matter is pinched in the door 2) has occurred based on results of the judgment of the first pinch condition, the second pinch condition, and the third pinch condition. Pinch judgment processing by the pinch judging unit 95 includes three kinds of processing described in FIGS. 11 to 13.

Figure 11:
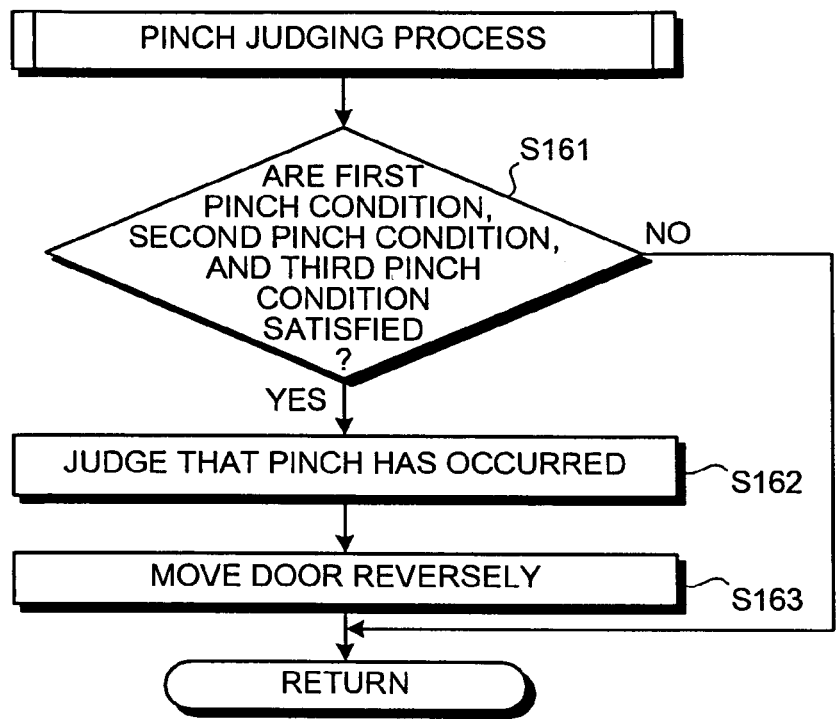
FIG. 11 is a flowchart of a first pinch judging process.

As described in FIGS. 11 and 4, in first pinch judgment processing, when the first pinch condition, the second pinch condition, and the third pinch condition are satisfied ("YES" at step S161), the pinch judging unit 95 judges that pinch has occurred (step S162). Thereafter, the pinch judging unit 95 moves the door 2 reversely to a present moving direction or stops the door 2 (step S163).

Figure 12:
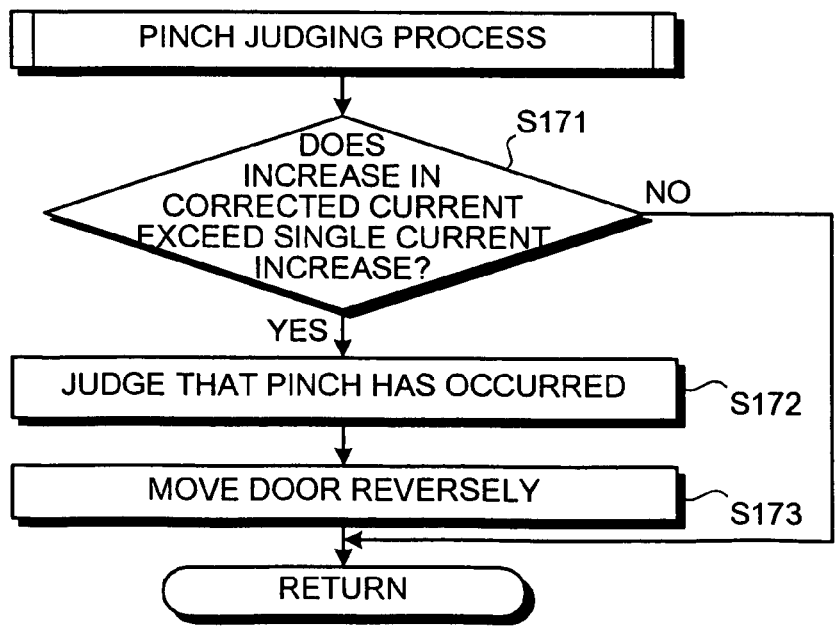
FIG. 12 is a flowchart of a second pinch judging process.

As described in FIGS. 12 and 4, in second pinch judgment processing, when the increase in the corrected current (Δ corrected current) calculated at step S101 in the first-condition judging process exceeds a predetermined single current increase ("YES" at step S171), the pinch judging unit 95 judges that pinch has occurred (step S172). Thereafter, the pinch judging unit 95 moves the door 2 reversely to a present moving direction or stops the door 2 (step S173). The single current increase is a high value higher than the reference current increase in the first-condition judging process. In the second pinch judgment processing, the pinch judging unit 95 judges that pinch has occurred from detection of only a corrected current even if the second pinch condition and the third pinch condition are not satisfied.

Figure 13:
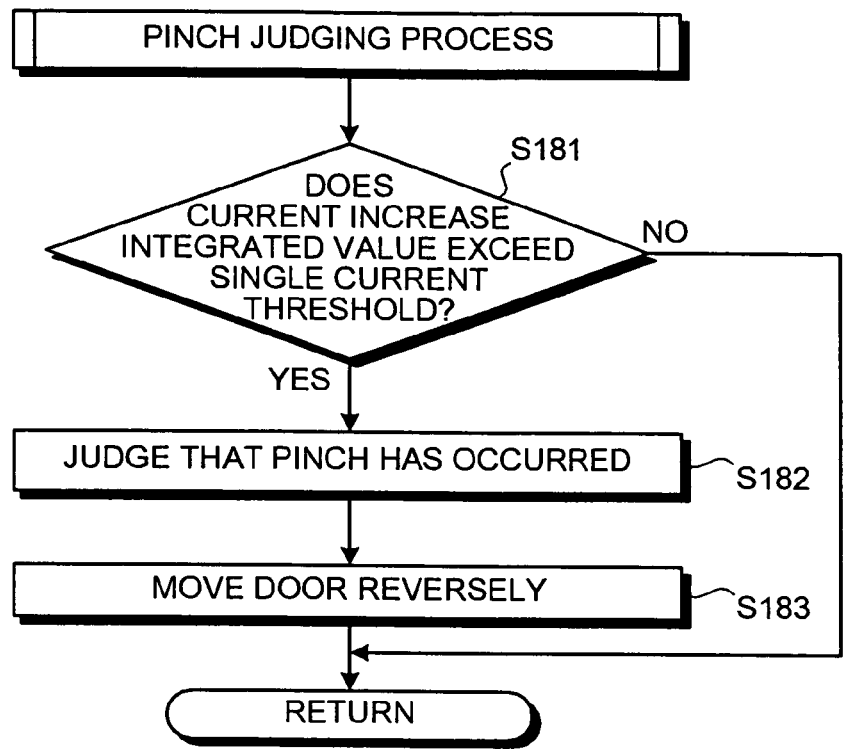
FIG. 13 is a flowchart of a third pinch judging process.

As described in FIGS. 13 and 4, in third pinch judgment processing, when the current increase integrated value integrated at step S103 in the first-condition judging process exceeds a predetermined single current threshold ("YES" at step S181), the pinch judging unit 95 judges that pinch has occurred (step S182). Thereafter, the pinch judging unit 95 moves the door 2 reversely to a present moving direction or stops the door 2 (step S183). The single current threshold is a high value higher than the current threshold in the first-condition judging process. In the third pinch judgment processing, the pinch judging unit 95 judges that pinch has occurred from detection of only a corrected current even if the second pinch condition and the third pinch condition are not satisfied.

Figure 14:
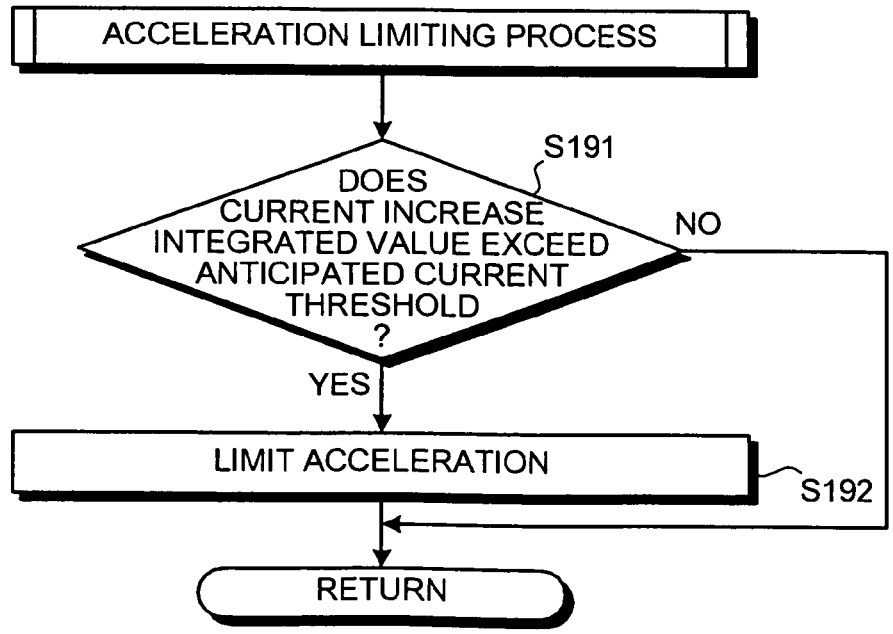
FIG. 14 is a flowchart of a first acceleration-limiting process.

The first judging unit 92 imposes a restriction on follow-up acceleration to target speed by the door-speed adjusting unit 91. Acceleration restriction processing by the first judging unit 92 includes two kinds of processing described in FIGS. 14 and 15. As described in FIGS. 14 and 4, in first acceleration restriction processing, when the current increase integrated value integrated in the first-condition judging process exceeds a predetermined anticipated current threshold ("YES" at step S191), the first judging unit 92 imposes a restriction on follow-up acceleration by the door-speed adjusting unit 91 (step S192). The anticipated current threshold is a low value lower than the current threshold in the first-condition judging process. When a corrected current is in a predetermined increasing state and a current increase integrated value exceeds the anticipated current threshold lower than the current threshold in the first-condition judging process, the first judging unit 92 judges that this is an indication of pinch. The first judging unit 92 imposes a restriction on the door-speed adjusting unit 91 such that the door-speed adjusting unit 91 does not accelerate door moving speed following the target speed even if one or both of motor rotation speed detected by the motor-speed detection circuit 56 and door moving speed detected by the door speed detection circuit 57 are in a decreasing state.

Figure 15:
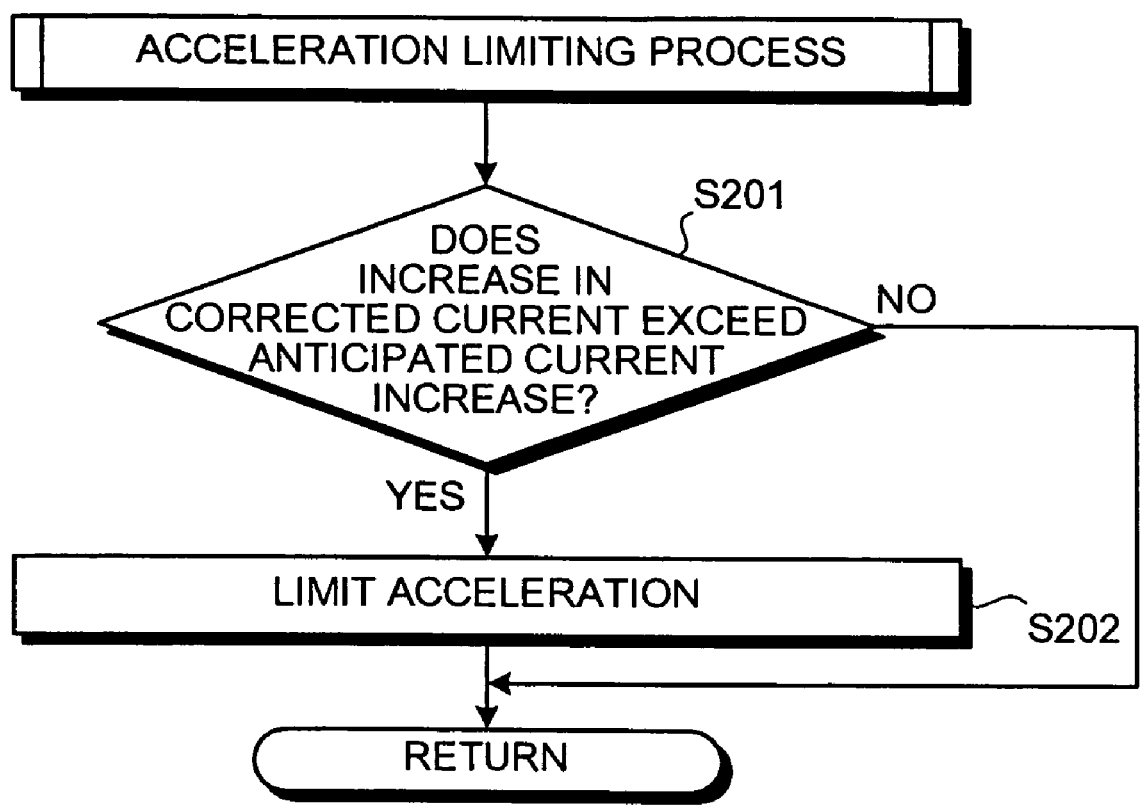
FIG. 15 is a flowchart of a second acceleration-limiting process.

As described in FIGS. 15 and 4, in second acceleration restriction processing, when the increase in a correction current (Δ corrected current) calculated at step S101 in the first-condition judging process exceeds a predetermined anticipated current increase ("YES" at step S201), the first judging unit 92 imposes a restriction on follow-up acceleration by the door-speed adjusting unit 91 (step S202). The anticipated current increase is a low value higher than the reference current increase in the first-condition judging process and lower than the single current increase in the second pinch judgment processing. When an increase in a corrected current exceeds the anticipated current increase lower than the single current increase in the first-condition judging process, the first judging unit 92 judges that this is an indication of pinch. The first judging unit 92 imposes a restriction on the door-speed adjusting unit 91 such that the door-speed adjusting unit 91 does not accelerate door moving speed following the target speed even if one or both of motor rotation speed detected by the motor-speed detection circuit 56 and door moving speed detected by the door speed detection circuit 57 are in a decreasing state.

As described above, in the door opening/closing device 3, when the first pinch condition obtained by the first judging unit 92, the second pinch condition obtained by the second judging unit 93, and the third pinch condition obtained by the third judging unit 94 are satisfied, the pinch judging unit 95 judges that pinch has occurred. On the other hand, even if the first pinch condition obtained by the first judging unit 92 is satisfied, the pinch judging unit 95 does not judge that pinch has occurred unless the second pinch condition obtained by the second judging unit 93 and the third pinch condition obtained by the third judging unit 94 are not satisfied.

For example, when first pinch conditions (A) and (B) are obtained, a vehicle body 1 is tilted in a direction in which the door 2 is moved. In this case, the door 2 moves ahead of driving of the driving motor 32 and a load other than pinch is applied to the door 2 because of a hunting behavior caused by transmission of a driving force of the driving motor 32 to the door 2. A phase difference occurs between door moving speed and motor rotation speed in the hunting behavior. Thus, although the first pinch conditions (A) and (B) are satisfied, the second pinch condition and the third pinch condition are not satisfied. As a result, the pinch judging unit 95 does not judge that pinch has occurred and does not perform reversal or stop control for the door 2. Note that, when the door 2 moved to be opened and closed by the door opening/closing device 3 is complementarily operated manually and the supplementary operation is stopped in the middle, the door 2 also moves ahead of driving of the driving motor 32 and a driving force of the driving motor 32 is transmitted to the door 2. In this case, a phase difference occurs between door moving speed and motor rotation speed as in the hunting behavior. Thus, although the first pinch condition according to a corrected current is satisfied, the second pinch condition and the third pinch condition are not satisfied.

On the other hand, as shown in FIG. 4, when a first pinch condition (C) is obtained, pinch has occurred. In this case, a phase difference is not caused between door moving speed and motor rotation speed. Thus, the first pinch condition (C) is satisfied and the second pinch condition and the third pinch condition are also satisfied. As a result, the pinch judging unit 95 judges that pinch has occurred and performs reversal or stop control for the door 2.

Therefore, in the door opening/closing device 3, it is possible to lower a current threshold for obtaining the first pinch condition in the first judging unit 92 compared with the threshold in the past by judging that a load other than pinch is applied to the door 2 according to a phase difference between door moving speed and motor rotation speed. As a result, it is possible to improve judging accuracy at the time when pinch actually occurs.

When a difference in a corrected current exceeds the predetermined reference current increase, the first judging unit 92 judges that the difference is in an increasing state and integrates an increase in the corrected current to obtain a current increase integrated value. This makes it possible to recognize an accurate increasing state of the corrected current. When a difference in a corrected current is in a decreasing state in which the difference is less than the reference current increase and the decreasing state continues for a predetermined time, the first judging unit 92 initializes the current increase integrated value. This makes it possible to obtain the first pinch condition accurately.

When a difference in door moving speed exceeds the predetermined reference door speed decrease, the second judging unit 93 judges that the difference is in a decreasing state and integrates a decrease in the door moving speed to obtain a door speed decrease integrated value. This makes it possible to recognize an accurate decreasing state of the door moving speed. When a difference in door moving speed is in an increasing state in which the difference is less than the reference door speed decrease and the increasing state continues for a predetermined time, the second judging unit 93 initializes the door speed decrease integrated value. This makes it possible to obtain the second pinch condition accurately.

When a difference in motor rotation speed exceeds the predetermined reference motor speed decrease, the third judging unit 94 judges that the difference is in a decreasing state and integrates a decrease in the motor rotation speed to obtain a motor speed decrease integrated value. This makes it possible to recognize an accurate decreasing state of the motor rotation speed. When a difference in motor rotation speed is in an increasing state in which the difference is less than the reference motor speed decrease and the increasing state continues for a predetermined time, the third judging unit 94 initializes the motor speed decrease integrated value. This makes it possible to obtain the third pinch condition accurately.

The first judging unit 92 sets the predetermined single current increase higher than the reference current increase. The pinch judging unit 95 judges that pinch has occurred when an increase in a corrected current exceeds the single current increase. In other words, when an increase in a corrected current is higher than the reference current increase by a predetermined amount, it is possible to judge that pinch has occurred even if the second pinch condition and the third pinch condition are not satisfied. When an object pinched in the door 2 is hard and has a high spring constant, it is possible to judge that pinch has occurred by grasping a tendency that a corrected current increases suddenly in one arithmetic operation cycle.

The first judging unit 92 sets the predetermined single current threshold higher than the current threshold. The pinch judging unit 95 judges that pinch has occurred when a current increase integrated value exceeds the single current threshold. In other words, when a current increase integrated value is higher than the current threshold by a predetermined amount, it is possible to judge that pinch has occurred even if the second pinch condition and the third pinch condition are not satisfied. When an object pinched in the door 2 is soft and has a low spring constant or when a load preventing door moving speed from increasing is present from the beginning and increases gradually, it is difficult to satisfy the second pinch condition and the third pinch condition. In such a case, it is possible to judge pinch by grasping a tendency that only a corrected current increases.

The first judging unit 92 sets the predetermined anticipated current threshold lower than the current threshold. While a current increase integrated value exceeds the anticipated current threshold, the first judging unit 92 imposes a restriction on follow-up acceleration to target speed by the door-speed adjusting unit 91 even if door moving speed falls. Consequently, when pinch actually occurs, it is possible to improve safety because a function conflicting with lowering of a load and improvement of judgment accuracy is restricted to judge the pinch by preventing the door 2 from being accelerated following the target speed.

The first judging unit 92 sets the predetermined anticipated current increase higher than the reference current increase. While an increase in a corrected current exceeds the anticipated current increase, the first judging unit 92 imposes a restriction on follow-up acceleration to target speed by the door-speed adjusting unit 91 even if door moving speed falls. Consequently, when pinch actually occurs, it is possible to improve safety because a function conflicting with lowering of a load and improvement of judgment accuracy is restricted to judge pinch by preventing the door 2 from being accelerated following the target speed.

According to the embodiments described above, it is possible to improve judgment accuracy at the time when pinch occurs actually.

Moreover, according to the embodiments described above it is possible to recognize an increasing state of a corrected current more accurately.

Furthermore, according to the embodiments described above, it is possible to accurately determine whether a first pinch condition is satisfied.

Moreover, according to the embodiments described above, it is possible to recognize a decreasing state of a door moving speed more accurately.

Furthermore, according to the embodiments described above, it is possible to accurately determine whether a second pinch condition is satisfied.

Moreover, according to the embodiments described above, it is possible to accurately recognize a decreasing state of a motor rotation speed.

Furthermore, according to the embodiments described above, it is possible to accurately determine whether a third pinch condition is satisfied.

Moreover, according to the embodiments described above, it is possible to improve safety.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

This application claims priority from Japanese Patent Application 2004-379883, filed Dec. 28, 2004, which is incorporated herein by reference in its entirety.

What is claimed is:

1. A door opening/closing device that moves a door by a motor, comprising:
   an ideal-current calculating unit configured to calculate an ideal current for moving the door at a target speed;
   a actual-current calculating unit configured to calculate an actual current to be actually supplied to the motor based on the ideal current and present speed of the door, wherein the actual-current calculating unit calculates the actual current at a predetermined cycle;
   a current adding unit configured to determine whether an actual current calculated in a present cycle is larger than an actual current calculated in a previous cycle, and to add, when the actual current calculated in the present cycle is determined to be larger than the actual current calculated in the previous cycle, a current difference between the actual current calculated in the present cycle and the actual current calculated in a previous cycle to a total current difference obtained by adding current differences that have been calculated;
   a first determining unit configured to determine that a first condition is satisfied when the total current difference exceeds a threshold;
   a door-speed detecting unit configured to detect a speed of the door, wherein the door-speed detecting unit detects the speed of the door at a predetermined cycle;
   a door-speed adding unit configured to determine whether a speed of the door detected in a present cycle is lower than a speed of the door detected in a previous cycle, and to add, when the speed of the door detected in the present cycle is determined to be lower than the speed of the door detected in the previous cycle, a speed difference between the speed of the door detected in the present cycle and the speed of the door detected in the previous cycle to a total speed difference obtained by adding speed differences that have been calculated;
   a second determining unit configured to determine that a second condition is satisfied when the total speed difference exceeds a threshold;
   a rotation detecting unit configured to detect a rotation speed of the motor, wherein the rotation detecting unit detects the rotation speed at a predetermined cycle;
   a rotation-speed adding unit configured to determine whether a rotation speed detected in a present cycle is lower than a rotation speed detected in a previous cycle, and to add, when the rotation speed detected in the present cycle is determined to be lower than the rotation speed detected in the previous cycle, a rotation difference between the rotation speed detected in the present cycle and the rotation speed detected in the previous cycle to a total rotation difference obtained by adding rotation differences that have been calculated;
   a third determining unit configured to determine that a third condition is satisfied when the total rotation difference exceeds a threshold;
   a pinch determining unit configured to determine whether a foreign matter is caught in the door based on determination by the first determining unit, the second determining unit, and the third determining unit.

2. The door opening/closing device according to claim 1, wherein the current adding unit adds the current difference calculated in the present cycle to the total current difference when the current difference calculated in the present cycle is larger than a reference value.

3. The door opening/closing device according to claim 2, wherein the current adding unit is further configured to initialize the total current difference when a predetermined time elapses in a state in which the current difference is smaller than the reference value.

4. The door opening/closing device according to claim 1, wherein the door-speed adding unit adds the speed difference calculated in the present cycle to the total speed difference when the speed difference calculated in the present cycle is larger than a reference value.

5. The door opening/closing device according to claim 4, wherein the door-speed adding unit is further configured to initialize the total speed difference when a predetermined time elapses in a state in which the speed difference is smaller than the reference value.

6. The door opening/closing device according to claim 1, wherein the rotation-speed adding unit adds the rotation difference calculated in the present cycle to the total rotation difference when the rotation difference calculated in the present cycle is larger than a reference value.

7. The door opening/closing device according to claim 6, wherein the rotation-speed adding unit is further configured to initialize the total rotation difference when a predetermined time elapses in a state in which the rotation difference is less than the threshold.

8. The door opening/closing device according to claims 2, wherein
   the pinch determining unit is configured to determine that a foreign matter is caught in the door when the current difference is larger than a second value having a higher value than the reference value.

9. The door opening/closing device according to claim 1, wherein the pinch determining unit is configured to determine that a foreign matter is caught in the door when the total current difference exceeds a second threshold having a higher value than the threshold.

10. The door opening/closing device according to claim 1, further comprising a limiting unit configured to limit an acceleration of the door when the total current difference exceeds a third threshold having a lower value than the threshold.

11. The door opening/closing device according to claim 2, further comprising a limiting unit configured to limit an acceleration of the door when the current difference is larger than a third value having a higher value than the reference value.

* * * * *